UNITED STATES PATENT OFFICE.

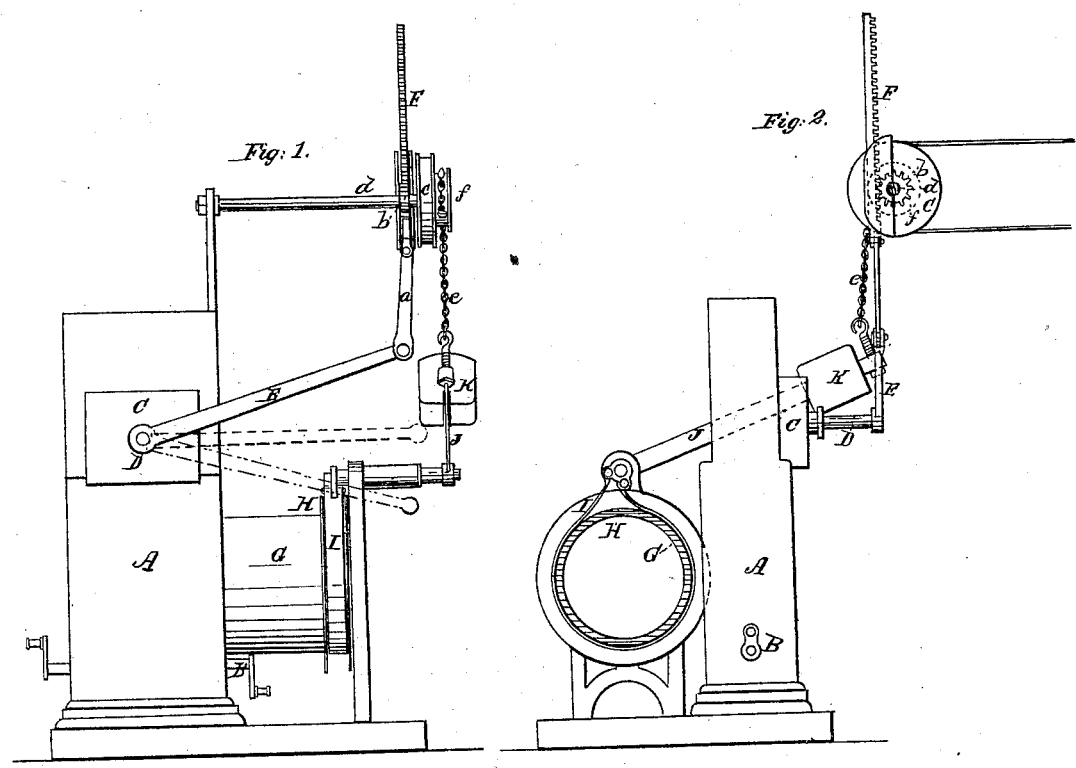
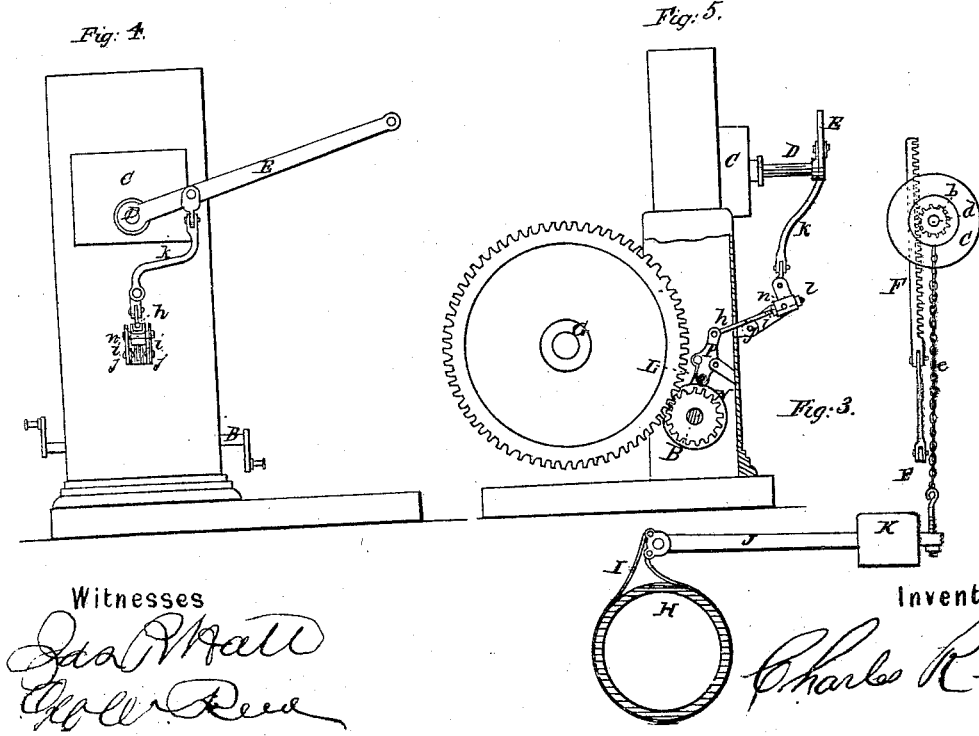

CHARLES R. OTIS, OF YONKERS, NEW YORK.

IMPROVEMENT IN BRAKES OF HOISTING APPARATUS.

Specification forming part of Letters Patent No. 44,740, dated October 18, 1864.

*To all whom it may concern:*

Be it known that I, CHARLES R. OTIS, of Yonkers, in the county of Westchester and State of New York, have invented a new and useful Improvement in the Application of Brakes to Hoisting Machinery Operated by Steam or other Engines; and I do hereby declare that the following is a full, clear, and exact description of the same, reference being had to the accompanying drawings, forming a part of this specification, in which—

Figure 1 is an elevation of the drum of a hoisting-machine and steam-chest of the hoisting-engine, showing the connection of the brake with the valve of the engine. Fig. 2 is an elevation corresponding with Fig. 1, but at right angles thereto and partly in section. Fig. 3 is a diagram illustrating the operation of the brake in combination with the valve. Figs. 4 and 5 are elevations at right angles to each other of a modification of my invention.

Similar letters of reference indicate corresponding parts in the several figures.

This invention consists in so combining the brake of a hoisting-machine with the stop-valve of a hoisting-engine that when the said valve is closed and the steam or other motive fluid shut off from the engine the brake is always in operation, and when the valve is open to admit the steam or other fluid to the engine the hoisting-machine is relieved of the friction of the brake.

To enable others skill d in the art to make and use my invention, I will proceed to describe it with reference to the drawings.

A, Figs. 1, 2, 3, 4, is the base or framing of the hoisting-engine; B the crank shaft, and C the steam-chest. D is the spindle of the stop and reverse valve, which may be of any form that will serve to stop and reverse the engine; and E is a lever fast upon the said spindle for turning it. When the said lever is in the central position shown in red outline in Fig. 1, the valve is closed and the steam shut off from the engine. By moving the said lever upward to or toward the position shown in black outline, the valve is opened to drive the engine in a direction for hoisting, and by moving it toward the position shown in blue outline the valve is opened to drive the engine in the reverse direction for lowering. The end of the said lever is connected by a rod, *a*, with a toothed rack, F, which works in gear with a pinion, *b*, which is secured firmly to a pulley, *c*, which is arranged to turn freely on a fixed stud, *d*, attached to any suitable support, and which is turned in one direction or the other to stop, start, or reverse the engine by a belt or other means at the command of the engineer or person in charge of the machinery.

G, Figs. 1, 2, and 3, is the drum of the hoisting-machine, having the brake-wheel H fast at one end of it. I is the brake-strap, and J the brake-lever, loaded with a weight, K, by which the necessary pressure is applied to the strap to produce the requisite degree of friction on the wheel H. This lever is connected, by means of a chain, *e*, with a pulley, *f*, which is fast to the pulley *c* and pinion *b*. When these pulleys are not otherwise held, the weight K depresses the lever J and keeps the brake in action, at the same time keeping the chain unwound entirely from the pulley *f* and nearly taut, as shown in Fig. 3, and keeping the pulleys *f c*, pinion *b*, and rack F in such a position that the valve-lever is kept in the central position, the brake being in operation and the steam shut off.

By turning the pulley *c* in one direction from the position above described, and represented in Fig. 3, the pinion *b* is caused to raise the rack F and the valve-lever and to open the valve in a direction to produce the forward revolution of the engine and raise the platform of the hoisting-machine, and by turning the pulley in the opposite direction the pinion is caused to depress the rack and the valve-lever and open the valve in a direction for reversing the engine and lowering the platform; but in whichever direction the pulley is turned in from the aforesaid position the chain *e* is wound up and the brake-lever raised, and the pressure of the brake thereby taken from the brake-wheel.

It will be understood from the foregoing description that while the engine is in operation in either direction the machine will be relieved of the pressure of the brake; but as soon as the steam is shut off the brake comes into operation, remaining so until the steam is again admitted to the engine.

In the modification of my invention shown in Figs. 4 and 5 the brake-strap L is applied to a wheel, N, on the crank-shaft B of the engine and connected with a lever, P, which works on a fixed fulcrum, $g$, Fig. 5. This lever P is also connected by a rod, $h$, the effective length of which is adjustable by a screw, $l$, and slide $n$, with two links, $i\,i$, which are arranged to vibrate upon fixed centers $j\,j$, and is also connected by a rod, $k$, with the valve-lever. The power to work the brake is in this case applied directly by the valve-lever without a weight in the following manner: When the said lever is in the central position, in which it closes the valve, the rod $h$ is parallel with center lines of the links $i\,i$ and the brake-strap is kept tight; but as the valve-lever rises or falls it raises or lowers said rod and links, and the rod $h$, having a larger radius than the links, works in an arc having a less versed sine, and so is caused to have a longitudinal movement, by which it produces a proper movement of the lever P to loosen the brake strap.

What I claim as my invention, and desire to secure by Letters Patent, is—

The combination and arrangement of levers and connections substantially as herein described, whereby the brake is automatically applied while the valve is closed, and withdrawn when the valve is opened, to set the apparatus in motion.

CHARLES R. OTIS.

Witnesses:
JAS. R. HALL,
GEO. W. REED.